(12) United States Patent
Pietromonaco

(10) Patent No.: US 8,450,954 B2
(45) Date of Patent: May 28, 2013

(54) ELECTRONICALLY CONTROLLED UNIVERSAL MOTOR

(75) Inventor: David V Pietromonaco, Cupertino, CA (US)

(73) Assignee: ARM Limited, Cambridge (GB)

(*) Notice: Subject to any disclaimer, the term of this patent is extended or adjusted under 35 U.S.C. 154(b) by 70 days.

(21) Appl. No.: 13/137,866

(22) Filed: Sep. 19, 2011

(65) Prior Publication Data

US 2013/0069566 A1 Mar. 21, 2013

(51) Int. Cl.
*H02K 23/64* (2006.01)

(52) U.S. Cl.
USPC .......................................... 318/245

(58) Field of Classification Search
None
See application file for complete search history.

(56) References Cited

U.S. PATENT DOCUMENTS

| 2008/0265825 A1* | 10/2008 | Su ................................ 318/685 |
| 2008/0298784 A1* | 12/2008 | Kastner ......................... 388/811 |
| 2011/0285256 A1* | 11/2011 | Hyde et al. ................... 310/68 R |

* cited by examiner

*Primary Examiner* — Lincoln Donovan
*Assistant Examiner* — Zoheb Imtiaz
(74) *Attorney, Agent, or Firm* — Nixon & Vanderhye P.C.

(57) ABSTRACT

An electric motor apparatus comprising a rotor component rotating with respect to a stator component. A rotational position indicator generates rotational position information indicative of a relative orientation of the rotor and stator components. A rotor winding control unit is fixedly mounted on the rotor component and is coupled to a rotor supply voltage supplied to the rotor component. The rotor control unit generates a rotor waveform in dependence on the rotational position information and applies the rotor waveform to a rotor winding arrangement. A stator winding waveform generator generates a stator waveform in dependence on the rotational position information and applies the stator waveform to a stator winding arrangement. The rotor waveform and stator waveform are generated in synchronization with the relative orientation of the rotor and stator components in order to synchronize mutual interactions of the rotor winding arrangement and the stator winding arrangement with the relative orientation.

32 Claims, 15 Drawing Sheets

DC Motor (Permanent Magnets on Rotor)

Induction Motor (Iron Rotor With conducting bars - not shown)

DIRECT RE-USE OF OVERSAMPLED AC SOURCE
VOLTAGE TO DRIVE A ROTOR WAVEFORM

USE OF OVERSAMPLED AC SOURCE VOLTAGE WITH
INVERSION TO DRIVE A ROTOR WAVE FORM

APPROXIMATION OF THREE ROTOR WAVEFORMS BY
DISTRIBUTION OF OVERSAMPLED AC SOURCE VOLTAGE

ELECTRONICALLY CONTROLLED UNIVERSAL MOTOR

BACKGROUND OF THE INVENTION

1. Field of the Invention

The present invention relates to electric motors and in particular to universal motors in which both the rotor and the stator have a winding arrangement.

2. Description of the Prior Art

It is known that there are various different ways to configure an electric motor, each of which has its own associated advantages and disadvantages. FIG. 1 schematically illustrates an axial view of a permanent magnet DC motor, wherein a set of permanent magnets are arranged around the circumference of the central rotor, whilst fixed windings on the stator are energised to cause rotation of the rotor with respect to the stator. Such DC motors are known to be relatively powerful but suffer from the magnetic drag of the permanent magnet mounted on the rotor and thereby lose efficiency.

FIG. 2 schematically illustrates an induction motor having the same stator arrangement as that illustrated in FIG. 1, but wherein the iron rotor has embedded conducting bars (e.g. made out of copper) in place of the permanent magnets. The energization of the stator winding arrangements induces currents in the conducting bars of the rotor. The interaction between the electromagnetic fields generated by the stator winding arrangement and these induced currents thus causes the rotor to rotate with respect to the stator. Induction motors are known to be very efficient at a given design speed, but lose efficiency when operated at different speeds.

A further known type of motor is the universal motor which is schematically illustrated in FIG. 3. Here both the rotor and the stator having a winding arrangement. Such a universal motor can be operated with either DC power or AC power, and generally provides a compact and high powered motor. To some extent, a universal motor can be viewed as combining the advantages of both induction motors and permanent magnet motors. However, the difficulties associated with coupling the required waveforms to the rotor winding arrangements have significant drawbacks.

More detail of the arrangement of a universal motor is schematically shown in FIG. 4. The rotor 10, configured to rotate on axle 15, has a set of windings 20 arranged around its circumference. The stator (not explicitly illustrated) surrounds the rotor 10 within which a set of stator coils (windings) 30 are arranged to correspond to the rotor windings 20. A power supply 35 supplies electrical power to both a stator coil control unit 40 and a rotor coil control unit 45. The stator coil control unit 40 generates a suitable stator waveform from the supplied power and provides this to the stator coils 30. However, powering the rotor windings 20 is not as simple as powering the stator windings 30 due to the rotation of the rotor. Accordingly, typical universal motor designs seek to take advantage of the rotation of the rotor by providing a commutator 50 which couples the externally supplied power to the rotor coils 20. The commutator comprises a set of contacts 55 mounted around the circumference of the axle of the rotor which intermittently come into contact with contacts 60. The set of contacts 55 are electrically coupled to the respective different windings 20 which make up the rotor winding arrangement. Hence, the rotation of the rotor sequentially couples different rotor coils 20 to the rotor coil control 45 enabling a sequence of waveforms to be applied to the rotor coils 20. However commutators are relatively primitive mechanical connectors which tend to be both noisy and inefficient.

An alternative known approach to providing the required electrical connections to the rotor is to arrange these in the form of slip rings. However, due to the number of separate electrical connections that are typically required, and the corresponding number of slip rings which must then also be provided, considerable manufacturing complexity is associated with a rotor comprising numerous slip rings and also with its shaft with a corresponding number of concentric power channels (typically layered on the shaft).

Accordingly it would be desirable to provide an electric motor apparatus configured as a universal motor, thus benefiting from the above described advantages of universal motors, but without the above-described disadvantages of coupling the motor windings to a external power source via noisy and inefficient commutators or using numerous slip rings.

SUMMARY OF THE INVENTION

Viewed from a first aspect, the present invention provides an electric motor apparatus an electric motor apparatus configured as a universal motor, said electric motor apparatus comprising:

a rotor component and a stator component, said rotor component arranged to rotate with respect to said stator component;

a rotor winding arrangement mounted on said rotor component;

a stator winding arrangement mounted on said stator component;

a rotational position indicator configured to generate rotational position information indicative of a relative orientation of said rotor component and said stator component;

a rotor winding control unit fixedly mounted on said rotor component, said rotor winding control unit coupled to a rotor supply voltage supplied to said rotor component and configured to perform a rotor waveform generation operation to generate a rotor waveform from said rotor supply voltage in dependence on said rotational position information and to apply said rotor waveform to said rotor winding arrangement; and a stator winding waveform generator configured to receive a stator supply voltage, to generate therefrom a stator waveform in dependence on said rotational position information and to apply said stator waveform to said stator winding arrangement, wherein said rotor waveform and said stator waveform are generated in synchronization with said relative orientation of said rotor component and said stator component in order to synchronize mutual interactions of said rotor winding arrangement and said stator winding arrangement with said relative orientation.

Accordingly an electric motor apparatus is provided which is configured as a universal motor, that is to say wherein both the rotor component and the stator component have respective winding arrangements. Further, there is provided a rotor winding control unit fixedly mounted on the rotor component, i.e. such that the rotor winding control unit rotates with the rotor component as part thereof. This rotor winding control unit performs a rotor waveform generation operation in order to generate the rotor waveform which is applied to the rotor winding arrangement. The rotor winding arrangement generates this rotor waveform from a rotor supply voltage which is supplied to the rotor component. Accordingly, the need for the commutators or numerous slip rings of the prior art is avoided, since only the externally supplied rotor supply voltage needs to be coupled to the rotor component. This means that the noise and inefficiency associated with a commutator and the manufacturing complexity associated with numerous slip rings are each avoided.

The rotor winding control unit generates the rotor waveform in dependence on rotational position information generated by a rotational position indicator, allowing the generation of the rotor waveform to be matched to the relative orientation of the rotor component and the stator component. Similarly, the stator winding waveform generator generates its stator waveform in dependence on this rotational position information, enabling the rotor waveform and the stator waveform to be generated in synchronisation with the relative orientation of the rotor component and the stator component, such that the mutual interactions of the rotor winding arrangement and the stator winding arrangement are synchronised with that relative orientation. In addition to the above-mentioned benefits associated with avoiding the use of the commutators and multiple slip rings, a further advantage of the electric motor apparatus disclosed herein is that the frequency of the rotor waveform is no longer dependent on the rotational frequency of the rotor component itself. This affords much greater flexibility in the selection of waveform frequencies which can be applied to the rotor and stator winding arrangements. Previously such decoupling of the rotational frequency of the rotor from the rotor waveform frequency, whilst in principle achievable with an arrangement having many slip rings, was impractical to realize due to the prohibitive cost of manufacturing and arranging the many slip rings. Further, since the significance of the rotational frequency is greatly reduced, the need for a mechanical transmission in many applications is avoided, since the rotational frequency can vary more easily than in conventional universal motor arrangements.

In one embodiment, said mutual interactions of said rotor winding arrangement and said stator winding arrangement cause said rotor component to be driven in rotation with respect to said stator component. In other words, the electrical motor apparatus disclosed herein can be implemented as an electric motor in which supplied electrical power is converted into driven rotation of the rotor component. In an alternative embodiment, said mutual interactions of said rotor winding arrangement and said stator winding arrangement cause resistance to rotation said of said rotor component with respect to said stator component. In other words, the electrical motor apparatus disclosed herein may alternatively be implemented as an electrical generator, in which rotational motion of the rotor component is converted into electrical power.

In one such embodiment, the electric motor apparatus further comprises at least one power extraction unit configured to extract electrical power induced in at least one of said rotor winding arrangement and said stator winding arrangement as a result of said resistance to rotation. When the electric motor apparatus is configured as an electrical generator, the electrical power induced in the rotor winding arrangement and/or the stator winding arrangement can be extracted by means of the power extraction unit.

In one embodiment said rotor supply voltage is supplied to said rotor component via a slip ring arrangement. Although, as mentioned above, a large number of slip rings can be disadvantageous due to the associated manufacturing complexity and cost, the electric motor apparatus of the present invention benefits from only a simple connection (providing the rotor supply voltage) being required to the rotor component and this simple connection may be efficiently provided by a simple slip ring arrangement having, for example, only two connections.

In one embodiment said rotor supply voltage is supplied to said rotor component via a first connection and a second connection, said first connection being arranged at a first axial side of said rotor component and said second connection being arranged at a second axial side of said rotor component. The fact that in the electric motor apparatus disclosed herein only the rotor supply voltage need be connected to the rotor component (i.e. not multiple different connections associated with the multiple coils of a rotor component) means that a notably simple arrangement for providing two external connections to the rotor component is enabled, for example each axial side of the rotor component being associated with one of the two connections of the rotor supply voltage.

There are a number of different ways in which the rotor winding control unit could be provided, but some embodiments take advantage of the fact that contemporary electronic technologies allow digital control units to be provided on a scale which is appropriate for mounting on the rotor component of an electric motor apparatus. Accordingly, in such embodiments the rotor winding control unit comprises a digital control unit and a digital-to-analogue converter. In such an arrangement the digital control unit provides the control capability to administer the rotor waveform generation operation, whilst the digital-to-analogue converter provides the necessary interface to the rotor winding arrangement.

It will be recognised that there are a number of ways in which a digital control unit could control a digital-to-analogue converter, but in one embodiment said digital control unit is configured to control said digital-to-analogue converter using binary encoded signals. In another embodiment said digital control unit is configured to control said digital-to-analogue converter using pulse-width-modulated signals.

In one embodiment said digital control unit comprises a microprocessor unit. As mentioned above, some embodiments take advantage at the fact that contemporary electronic technologies allow a relatively high degree of control capability to be mounted on the rotor component in the form of a digital control unit and this particular embodiment provides that digital control unit as a microprocessor unit. Contemporary microprocessor units pack a great deal of processing capability into a very small form factor, meaning that the data processing capability required to generate the rotor waveform in dependence on the rotational position information, even when for example the rotor is rotating at high speed, can be provided by embodying the digital control unit as a microprocessor, and furthermore this is done without physically burdening the rotor component with a large additional component.

In one embodiment said rotor winding arrangement mounted on said rotor component comprises a plurality of electrically separate windings spaced around a circumference of said rotor component.

In one such embodiment said rotor winding control unit is configured to apply an individual rotor waveform to each of said plurality of electrically separate windings of said rotor winding arrangement. Accordingly, the rotor winding control unit has great flexibility in its control over the interaction of the rotor winding arrangement with the stator winding arrangement by providing each of the electrically separate windings with an individual rotor waveform.

The provision of the electric motor apparatus disclosed herein, in particular the fact that the rotor waveform frequency has been decoupled from the rotational frequency of the rotor component, also gives great flexibility in how the rotor winding arrangement and stator winding arrangement can be provided. In particular, many different permutations of the number of electrically separate windings on each can be envisaged. Accordingly, in some embodiments said rotor winding arrangement and said stator winding arrangement have a same number of electrically separate windings as one another. Alternatively, in another embodiment, said rotor winding arrangement and said stator winding arrangement have a different number of electrically separate windings from one another.

Another feature of the flexibility with which the electric motor disclosed herein can be configured relates to the format of the rotor waveform and the stator waveform. Given the above mentioned departure from an explicit link between the rotor waveform frequency and the rotational frequency of the rotor component, a range of different formats of the rotor waveform and the stator waveform are envisaged. Accordingly, in some embodiments at least one of said rotor waveform and said stator waveform comprises a sinusoidal waveform. Alternatively, or in addition, in some embodiments at least one of said rotor waveform and said stator waveform comprises a pulsed waveform. Other periodic waveforms are also contemplated, such as sawtooth, triangular or square waveforms, or composite waveforms made of a combination thereof.

It should be appreciated that there are a number of different ways in which the rotational position indicator could be implemented. For example arrangements to provide this rotational position indication could be based on light sources/detectors, Hall effects sensors, mechanical devices and so on. However in one particular embodiment said rotational position indicator comprises a reading unit configured to read a shaft encoding. Accordingly, an encoding provided on the shaft of the rotor component can be read by the reading unit to determine the relative orientation of the rotor component and the stator component.

In one embodiment said stator winding waveform generator comprises a stator winding control unit configured to communicate with said rotor winding control unit. Whilst the necessary synchronization of the rotor waveform and the stator waveform can be achieved only by means of the generation of each with respect to the rotational position information, configuring the stator winding control unit and rotor winding control unit to communicate with one another facilitates the synchronization of the mutual interactions of the rotor winding arrangement and the stator winding arrangement since various items of information can be exchanged between the two. For example not only can appropriate timing of the rotor waveform and the stator waveform be monitored and adjusted, but also the rotational position information can be transmitted to one control unit to the other this way, such as from the stator winding control unit to the rotor winding control unit.

It should be appreciated that the communication between the stator winding control unit and the rotor winding control unit could be provided in a number of ways, but in one embodiment said stator winding control unit is configured to communicate wirelessly with said rotor winding control unit. Various different wireless communication protocols are known, such as Bluetooth, wi-fi, RF signalling and so on. Alternatively the "wireless" communication could be performed optically.

Alternatively, in another embodiment said stator winding control unit is configured to communicate via a wired connection with said rotor winding control unit. Although in some embodiments this wired connection could be provided via another coupling onto the rotor component (e.g. by the provision of a dedicated slip ring) in one embodiment communication via said wired connection is overlaid on said rotor supply voltage. In other words, the fact that a conduction path already exists to provide the rotor supply voltage to the rotor component can be taken advantage of by modulating this supply voltage to encode the communication between the rotor and stator winding control units.

In one embodiment said control unit is mounted on an axial face of said rotor component. Although the rotor winding control unit could in principle be mounted in a number of different ways in or on said rotor component, mounting the rotor winding control unit on an axial face of said rotor component facilitates cooling of the rotor winding control unit as well as simplifying manufacturing/maintenance.

The universal motor can be powered by either DC or AC voltage and accordingly in some embodiments said rotor supply voltage is a DC voltage whilst in other embodiments said rotor supply voltage is an AC voltage.

In some embodiments in which the rotor supply voltage is an AC voltage, said rotor winding control unit comprises an oversampler configured to oversample said AC voltage. Accordingly rather than, say, converting the AC supply voltage into a DC voltage for further conversion into an appropriate rotor waveform, the provision of an oversampler enables the AC voltage to be oversampled (i.e. sampled at a higher frequency than that of the AC voltage itself) and the resulting "fine-sliced" samples of the AC supply voltage can then be directly used to form components of the rotor waveform.

For example, in one embodiment said rotor winding control unit comprises a distributor configured to distribute selected portions of said oversampled AC voltage to said rotor winding arrangement. Accordingly, the rotor winding control unit can use this distributor to apply the selected portions of the oversampled voltage to the rotor winding arrangement. For example, when providing a number of different rotor waveforms to a number of electrically separate windings, the distributor can simply distribute the select portions of the oversampled AC voltage to the electrically separate windings of the rotor winding arrangement.

In one embodiment said rotor winding arrangement comprises a plurality of electrically separate windings and said distributor is configured to distribute said selected portions of said oversampled AC voltage amongst said plurality of electrically separate windings. Accordingly the distributor can provide each of the plurality of electrically separate windings with an appropriate sample taken from the oversampled AC voltage as required.

It may be the case that a particular sample taken from the oversampled AC voltage can be appropriately supplied to more than one of the separate windings at the same time and hence in one embodiment said distributor is configured to selectively distribute at least one of said selected portions of said oversampled AC voltage simultaneously to more than one of said electrically separate windings.

It should be appreciated that the rotor component and the stator component can be arranged variously with respect to one another. In one embodiment in axial view said rotor component is mounted inside said stator component. In other words the rotor component rotates within the stator component. In another embodiment in axial view said rotor component is mounted outside said stator component. In other words the rotor component rotates outside the stator component.

Viewed from a second aspect the present invention provides an electric motor apparatus configured as a universal motor, said electric motor apparatus comprising:

rotor means and stator means, said rotor means for rotating with respect to said stator means;

rotor winding means mounted on said rotor means;

stator winding means mounted on said stator means;

rotational position indication means for generating rotational position information indicative of a relative orientation of said rotor means and said stator means;

rotor winding control means fixedly mounted on said rotor component, said rotor winding control means coupled to a rotor supply voltage supplied to said rotor component and for performing a rotor waveform generation operation to generate a rotor waveform from said rotor supply voltage in dependence on said rotational position information and for applying said rotor waveform to said rotor winding means; and stator winding waveform generation means for receiving a stator supply voltage, for generating therefrom a stator waveform in dependence on said rotational position information and for applying said stator waveform to said stator winding means, wherein said rotor waveform and said stator waveform are generated in synchronization with said relative orientation of said rotor means and said stator means in order to synchronize mutual interactions of said rotor winding means and said stator winding means with said relative orientation.

Viewed from a third aspect of the present invention provided a method of operating an electric motor apparatus configured as a universal motor, said electric motor apparatus comprising: a rotor component and a stator component, said rotor component arranged to rotate with respect to said stator component; a rotor winding arrangement mounted on said rotor component; and a stator winding arrangement mounted on said stator component, the method comprising:

generating rotational position information indicative of a relative orientation of said rotor component and said stator component;

coupling a rotor winding control unit fixedly mounted on said rotor component to an rotor supply voltage supplied to said rotor component;

performing a rotor waveform generation operation in said rotor winding control unit to generate a rotor waveform from said rotor supply voltage in dependence on said rotational position information;

applying said rotor waveform to said rotor winding arrangement;

receiving a stator supply voltage in a stator winding waveform generator and generating therefrom a stator waveform in dependence on said rotational position information; and applying said stator waveform to said stator winding arrangement, wherein said rotor waveform and said stator waveform are generated in synchronization with said relative orientation of said rotor component and said stator component in order to synchronize mutual interactions of said rotor winding arrangement and said stator winding arrangement with said relative orientation.

BRIEF DESCRIPTION OF THE DRAWINGS

The present invention will be described further, by way of example only, with reference to embodiments thereof as illustrated in the accompanying drawings, in which.

DESCRIPTION OF THE PREFERRED EMBODIMENTS

Figure 1:
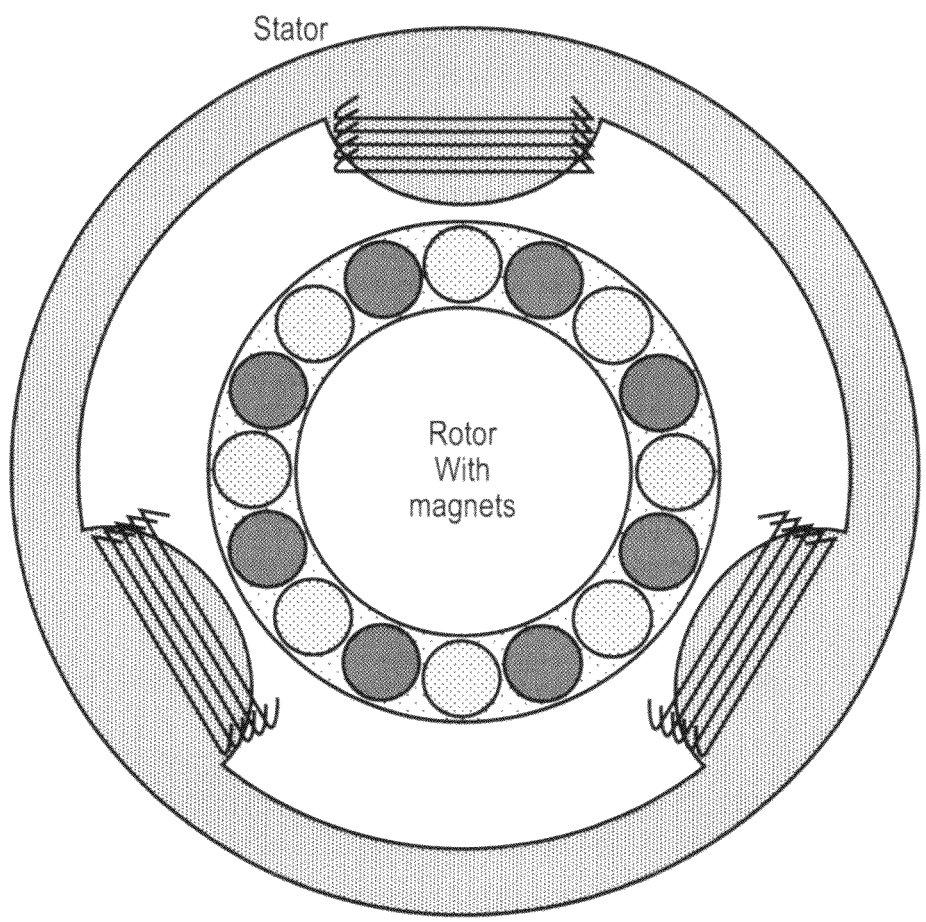
FIG. 1 schematically illustrates a known DC motor having permanent magnets spaced around the circumference of the rotor.
Figure 2:
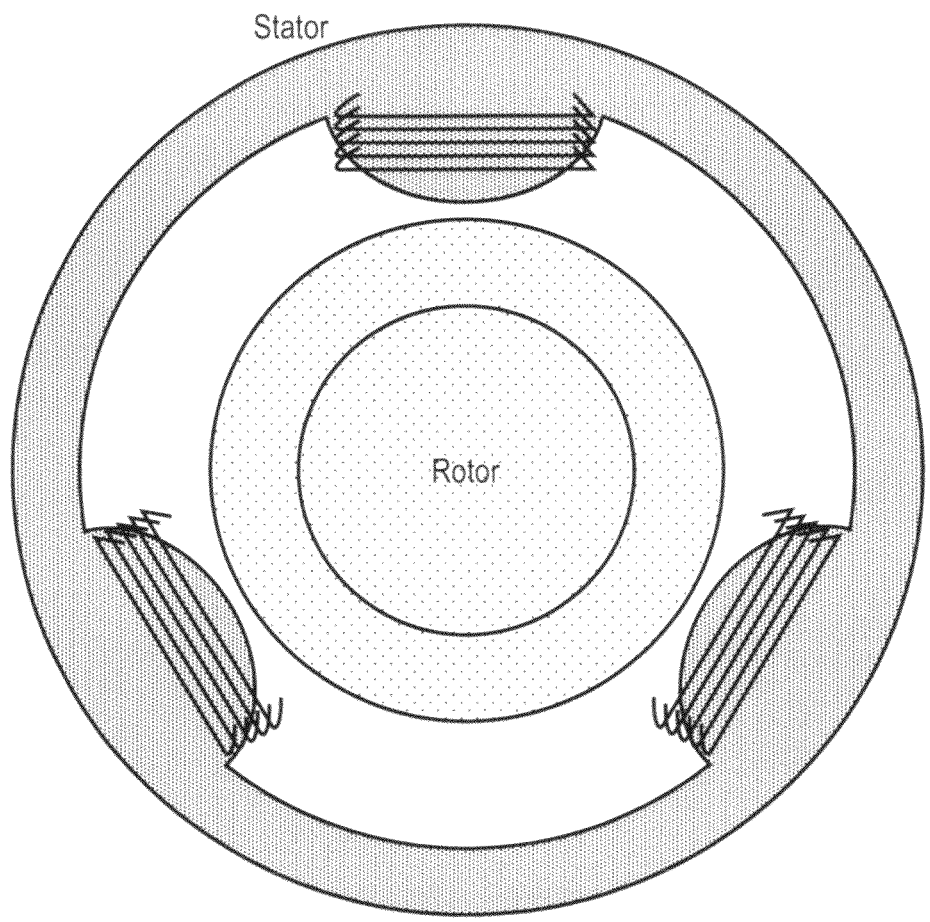
FIG. 2 schematically illustrates a known induction motor.
Figure 3:
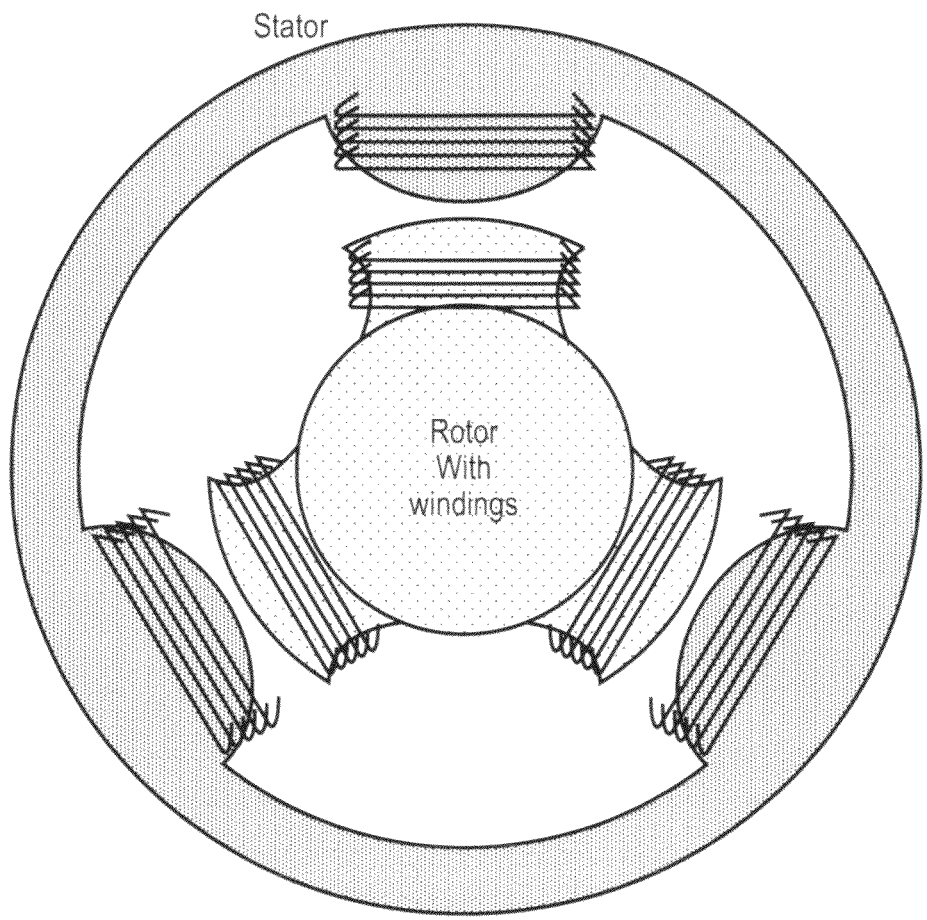
FIG. 3 schematically illustrates a known universal motor in which both the rotor and stator have windings.
Figure 4:
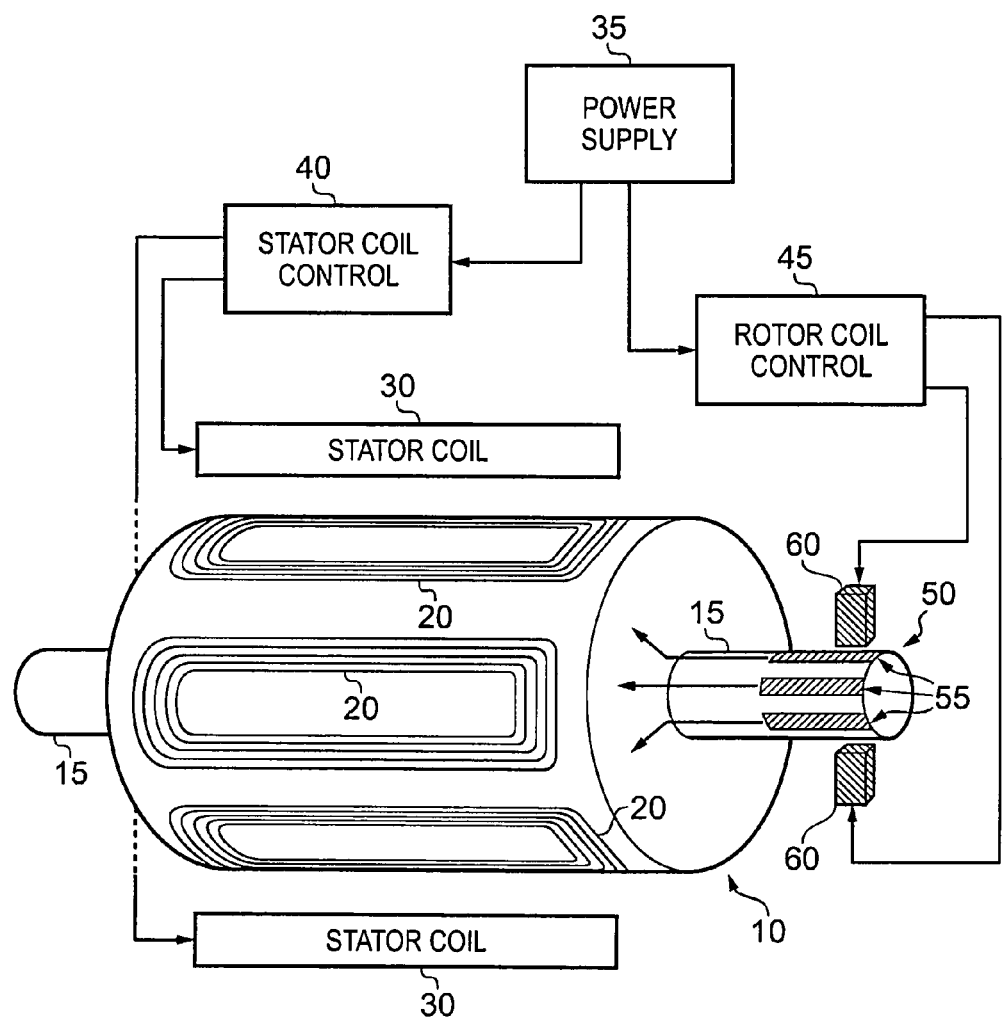
FIG. 4 schematically illustrates a known universal motor illustrating the use of a commutator to couple the rotor coils to an external supply.
Figure 5:
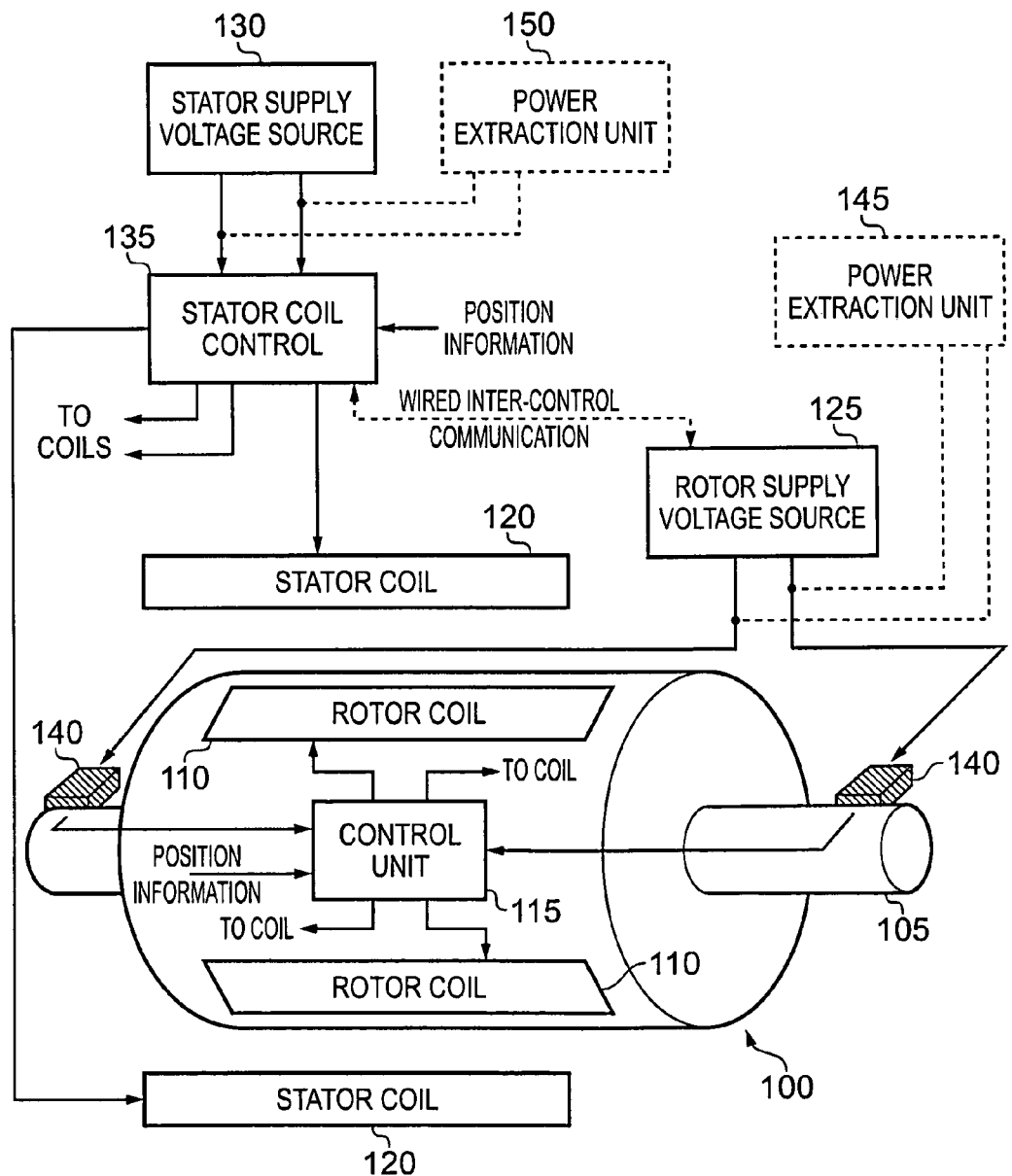
FIG. 5 schematically illustrates a universal motor according to one embodiment.

FIG. 5 schematically illustrates an electric motor apparatus in one embodiment. The rotor 100, configured to rotate on axle 105, has, a set of rotor coils 110 arranged around its circumference (of which only two are explicitly illustrated). The rotor coils 110 each comprise a winding arrangement which is configured to be supplied with a rotor waveform from control unit 115. The application of the rotor waveforms to the rotor coils 110 causes mutual interactions between the rotor coils 110 and the stator coils 120, which form part of the stator component (not explicitly illustrated) of the electric motor apparatus.

A rotor supply voltage source 125 and a stator supply voltage source 130 are provided to power the rotor and stator coils respectively. The stator supply voltage source 130 is coupled to a stator coil control unit 135, which is configured to generate stator waveforms which are applied to the stator coils 120. The stator coil control unit 135 generates the stator waveforms in dependence on position information which it receives, indicating the relative orientation of the rotor coil component with respect to the stator component. Further detail of the generation of this position information will be discussed in more detail below. The rotor supply voltage source 125 is coupled to the rotor component 100, such that the rotor supply voltage is provided to the rotor winding control unit 115. In the illustrated embodiment, the connection to the rotor component for the rotor supply voltage is provided by contact 140 in a slip ring arrangement which will be discussed in more detail below. As can be seen in FIG. 5, the two contacts 140 are coupled to each end of the axle 105 of the rotor component 100, such that a constructionally simple axle is used, which need only provide a single power connection to either end of the rotor component.

It should be noted that for clarity of illustration in FIG. 5 the control unit 115 is illustrated centrally with respect to the rotor component, but this positioning is not necessary. Indeed, as will be discussed with respect to FIG. 6 below, it may be preferable in some circumstances to arrange the rotor winding control unit to be mounted at an axial end of the rotor component.

In some embodiments the stator coil control unit 135 and rotor coil control unit 115 may be arranged to communicate with one another. Whilst this communication may be wireless, as will be discussed in more detail below, in some embodiments there may be a wired communication path provided between these two units. One-way of providing this wired inter-control communication path is to take advantage of the connection to the rotor control unit 115 already provided by its supply voltage path. In this arrangement, the communication between the stator coil control unit 135 and the rotor coil control unit 115 is provided by overlaying the communication signals on the voltage paths provided between rotor supply voltage source 125 and the rotor control unit 115. For example, the overlaying of this communication may be provided by frequency or amplitude modulation of the voltage, when the voltage is provided as an AC voltage and by other known transmission path signalling techniques for a DC voltage supply. Piggybacking on the voltage supply path in this manner has the advantage that a wired communication path between the stator coil control unit 135 and rotor coil control unit 115 can be provided without the need to provide an additional dedicated connection onto the rotor component (e.g. via a further slip ring).

It should be recognised that the electric motor apparatus schematically illustrated in FIG. 5 could be provided as a motor, wherein mutual interactions of the rotor coils 110 and the stator coils 120 cause the rotor component 100 to be driven in rotation with respect to the stator. Alternatively, the electric motor apparatus schematically illustrated in FIG. 5 could be configured as an electric generator in which the mutual interactions of the rotor coils 110 and the stator coils 120 cause resistance to rotation of the rotor component 100 with respect to the stator. When configured as a generator, the electric motor apparatus can be further provided with power extraction units 145,150 coupled to the rotor and stator supply voltage lines respectively, such that electric power introduced into these paths by the rotation of the rotor against the resistance provided by the mutual interaction of the rotor coils 110 and stator coils 120 can be extracted. In principle, only one power extraction unit (either 145 or 150) is necessary. The skilled person is familiar with the configuration of an electric generator, and further detail is not provided here for the sake of brevity.

The electric motor apparatus, whether configured as a motor or as a generator, benefits from the fact that the rotor waveforms are generated locally on the rotor component and are therefore not dependent on the rotational frequency of the rotor component. This means that in many applications the need for a mechanical transmission is avoided. For example, when configured as a motor, the rotational frequency of the rotor component can be selected to correspond to the desired rotational speed of the end application, whereas in many applications of conventional universal motors a mechanical transmission would be provided to allow the motor to operated at its preferred speed, and to convert that preferred speed into the desired end application speed. Conversely, when configured as a generator, the rotor component can be allowed to rotate at a speed dictated by the driving force (e.g. by the turning of a wind turbine), rather than by the "preferred" rotational speed of a conventional universal motor arranged as a generator.

Figure 6:
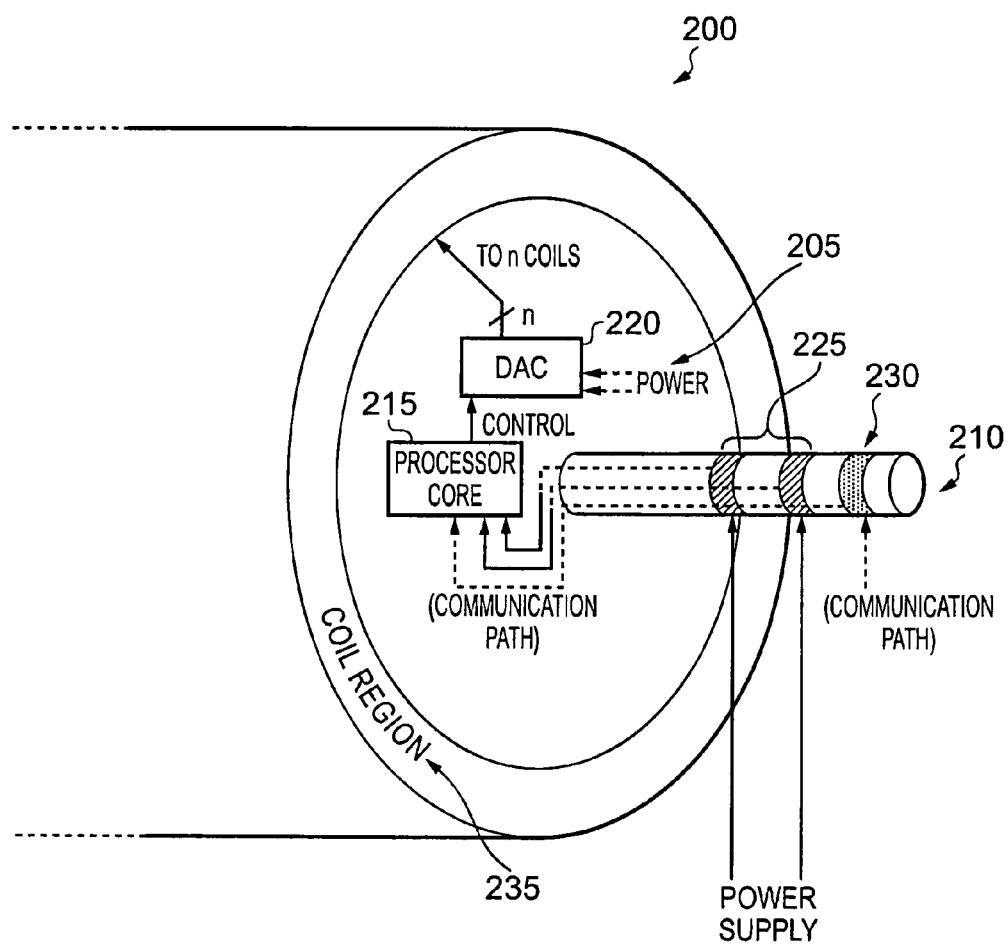
FIG. 6 schematically illustrates a rotor control unit mounted on an axial face of the rotor component and coupled to an external power supply via slip rings in one embodiment.

FIG. 6 schematically illustrates an embodiment, as mentioned above, wherein the rotor winding control unit is mounted on an axial face of the rotor component. For clarity of illustration, in FIG. 6 only the end region of the rotor component 200 is illustrated, showing the axial end face 205 of the rotor component and the axle 210. Fixedly mounted on the axial face 205 of the rotor component 200 are a microprocessor unit (processor core) 215 and a digital-to-analogue converter 220. Both processor core 215 and digital-to-analogue converter 220 are powered via a power supply received from external to the rotor component. This power supply is coupled to the rotor component via the slip ring arrangement 225. In embodiments in which a separate wired communication path is provided between the rotor control unit (i.e. the processor core 215 in FIG. 6) and the stator control unit, this may be provided by an additional slip ring 230 as illustrated.

The processor core 215 acts as a digital control unit to control the operation of the digital-to-analogue converter (DAC) 220, which generates the rotor waveforms which are applied to the rotor coils. The rotor coils are not explicitly illustrated in FIG. 6 but are located in the outer coil region 235 of the rotor component 200. The digital-to-analogue converter 220 has n connections to each of the n electrically separate windings spaced around the coil region 235 at the outer circumference of the rotor component 200.

Figure 7A:
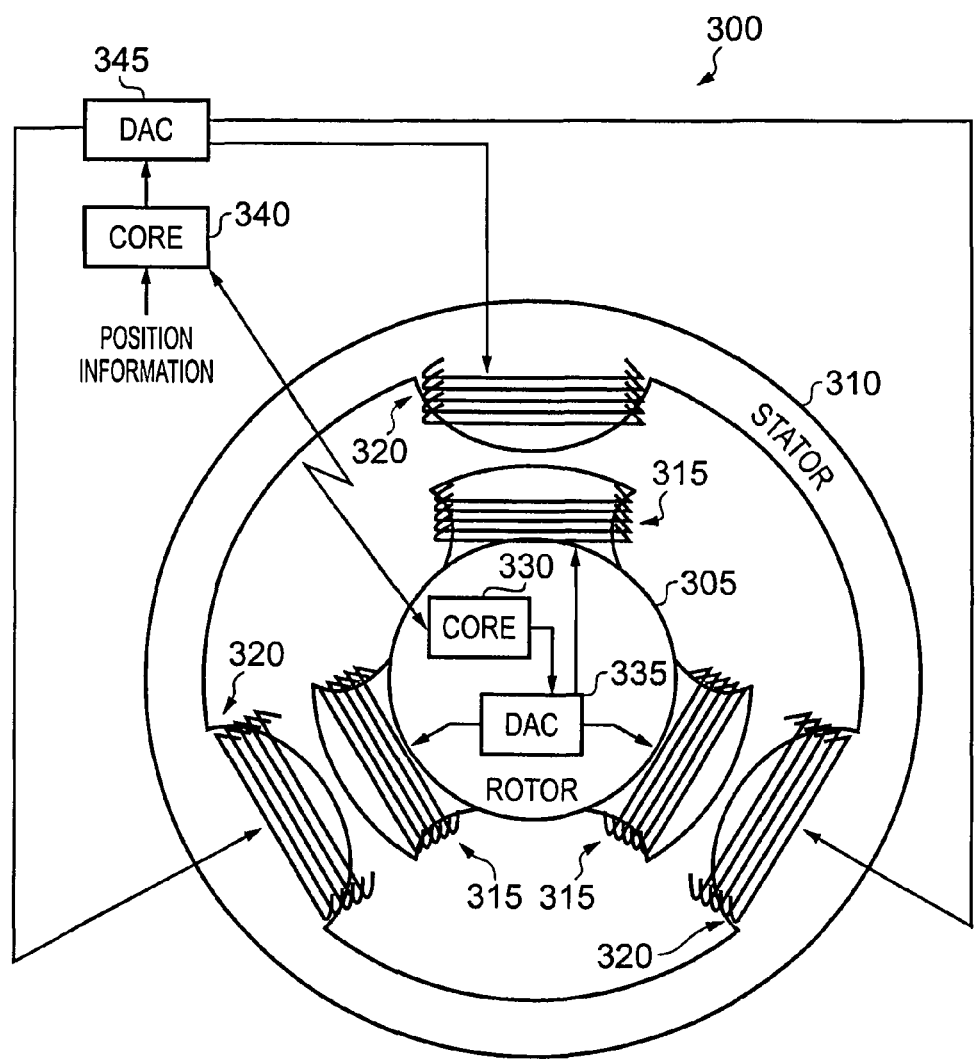
FIG. 7A schematically illustrates an axial view of a universal motor according to one embodiment in which a rotor winding control unit and stator winding control unit communicate wirelessly with one another.

FIG. 7A schematically illustrates an electric motor apparatus 300 in an embodiment in which the rotor winding control unit and stator winding control unit are configured to communicate wirelessly with one another. In this embodiment the electric motor apparatus comprises a rotor component 305 having a rotor winding arrangement comprising three sets of rotor coils 315, and a stator component 310 comprising a stator winding arrangement which comprises three sets of stator coils 320. The rotor coils 315 are provided with rotor waveforms by digital-to-analogue converter (DAC) 335 under control of the processor core 330, while the stator coils 320 are provided with stator waveforms by digital-to-analogue converter (DAC) 345 under control of processor core 340. Processor core 340 is configured to receive position information indicative of the relative orientation of the rotor component and the stator component. The stator processor core 340 and the rotor processor core 330 are configured to communicate wirelessly with one another, in this embodiment by RF signalling. As part of this wireless communication the processor core 340 provides the processor core 330 with the position information, enabling the two processor cores to synchronize the operation of the digital-to-analogue converters 335 and 345 and furthermore avoiding the need for a wired connection to processor core 330 to provide this information.

Figure 7B:
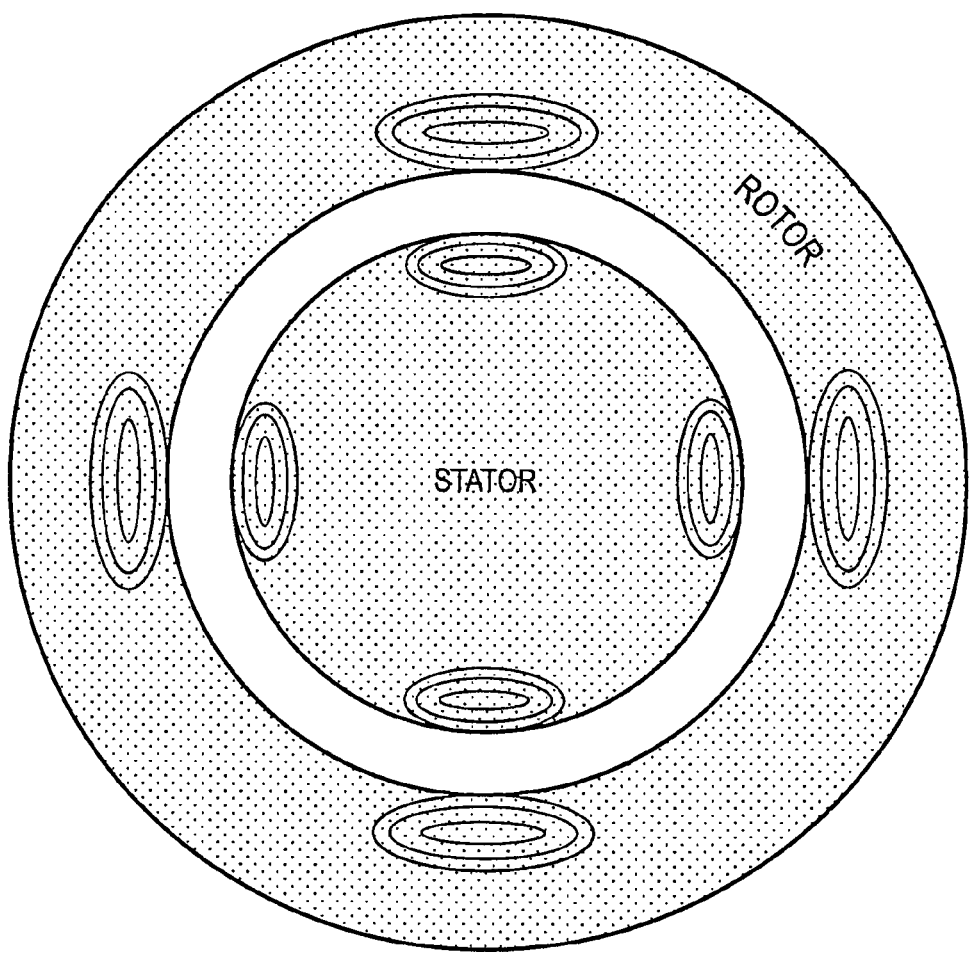
FIG. 7B schematically illustrates an axial view of an alternative arrangement in which the rotor component is arranged outside the stator component.

It should be appreciated that whilst the embodiments described thus far have all been arranged such that the rotor component rotates within the stator component, it is not necessary for this to be the case. FIG. 7B schematically illustrates an alternative arrangement in which the rotor component is arranged to rotate around the outside of the stator component. Such a configuration can thus provide a kind of "disc motor", which could for example be employed as the driving force for a motorised bicycle wheel (amongst numerous other applications).

Figure 8:
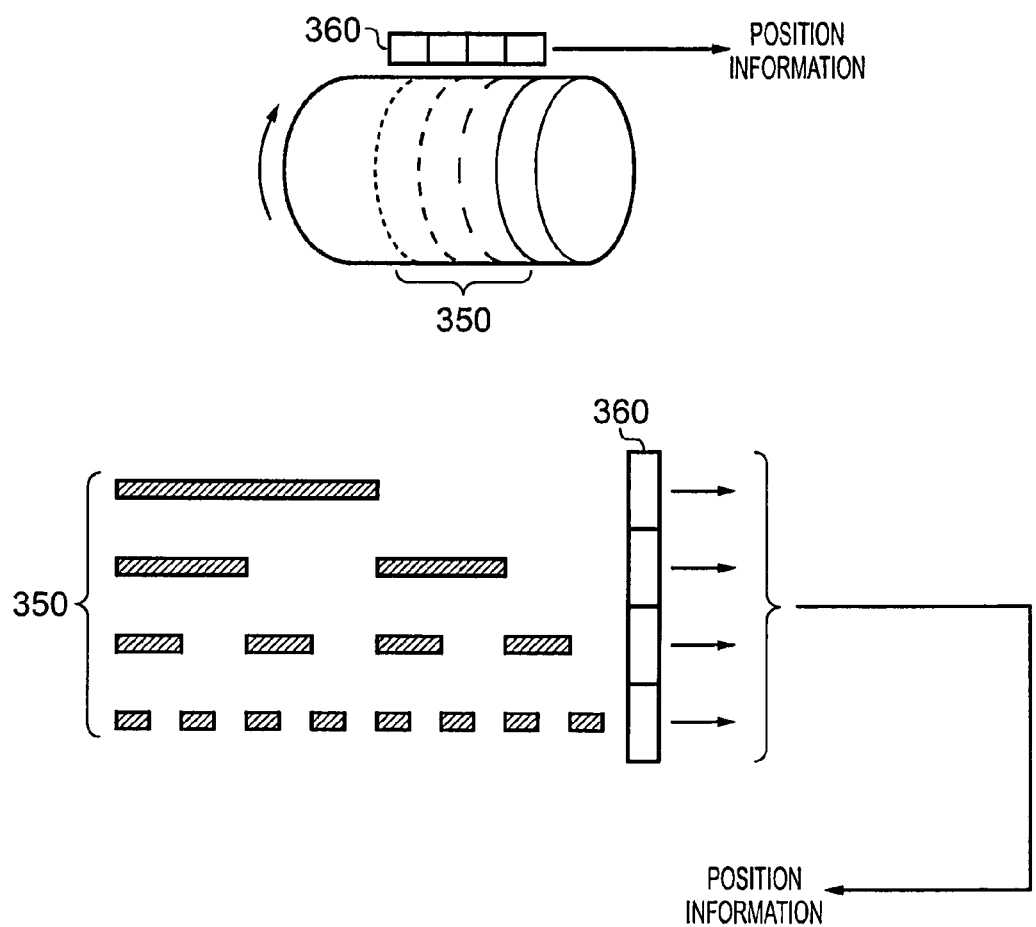
FIG. 8 schematically illustrates a rotational position indicator in one embodiment in which a shaft encoding is used to determine the relative orientation of the rotor component and the stator component.

FIG. 8 illustrates how the rotational position information may be generated in one embodiment. Here, the rotational position indicator comprises a reading unit 360 configured to read a shaft encoding 350 marked around the circumference of a section of the axle of the rotor component. The reading unit 360 comprises four separate detectors, which are arranged to determine whether that section of the reading unit is currently positioned above a marked or an unmarked portion of the shaft encoding. In this way, as can be seen in the lower half of FIG. 8, the combination of binary values (indicating a marked or a non-marked section of the shaft encoding) form a binary encoding of the relative orientation of the rotor component and the stator component. The arrangement illustrated in FIG. 8 may of course vary, whether in terms of the number of detectors which form the reading unit 360 or in terms of the particular encoding 350 marked on the shaft. Conversely, it should be noted that whilst in the embodiment illustrated in FIG. 8 the encoding is marked on the rotor component and the reading unit is mounted fixedly with respect to the stator component, the inverse is also contemplated wherein an encoding is marked on the stator component and read by a reading unit fixedly mounted with respect to the rotor component.

Figure 9:
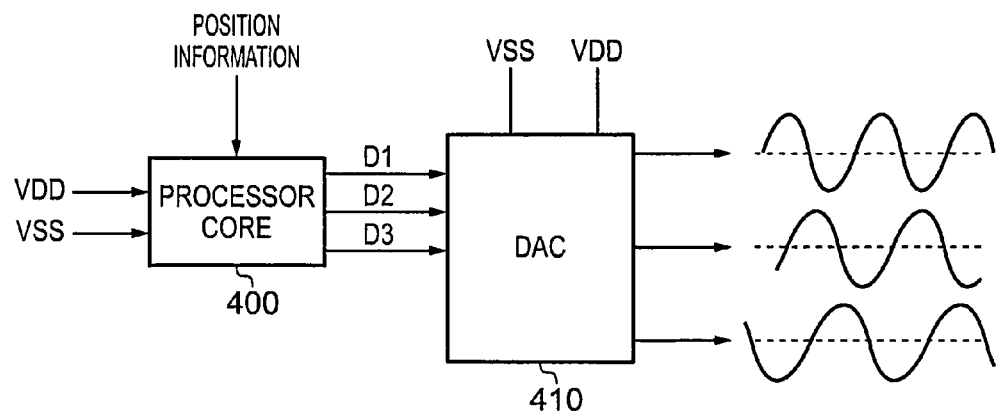
FIG. 9 schematically illustrates a processor core forming a digital control unit in one embodiment and the conversion of digital control signals by a digital-to-analogue converter into rotor waveforms.
Figure 9:
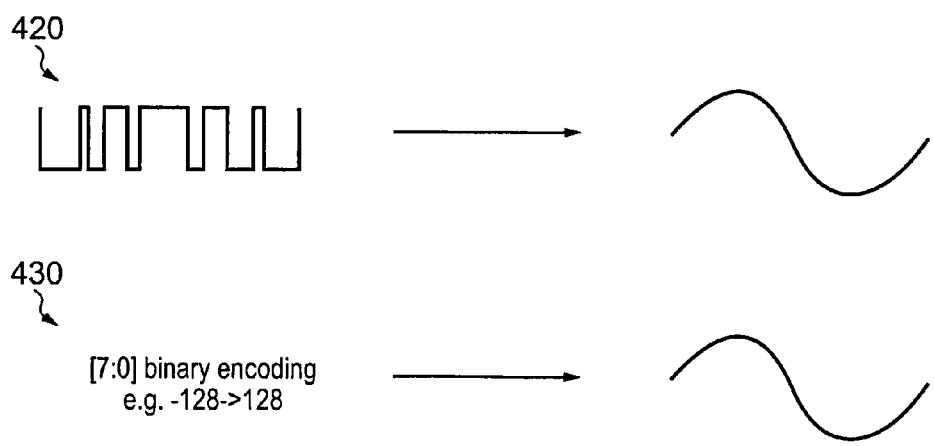

FIG. 9 schematically illustrates the generation of a set of three rotor waveforms by a rotor winding control unit, which in the illustrated example comprises a digital control unit in the form of a processor core 400 which controls a digital-to-analogue converter (DAC) 410. Both the processor core 400 and the digital-to-analogue converter 410 are provided with a DC voltage supply (VDD and VSS). The processor core 400 further receives position information indicative of the relative orientation of the rotor component and the stator component. On the basis of this rotational position information, the processor core 400 controls the DAC 410 by means of three digital control signals D1, D2 and D3. Each of these control signals determines the rotor waveform which should be passed to a respective rotor coil by the DAC 410. These digital control signals may take a number of forms, for example in the form of a pulse-width-modulated signal 420 or a binary encoding 430 (see lower half of FIG. 9) which is then converted into the analogue rotor waveform signal via known digital-to-analogue conversion techniques in DAC 410.

Figure 10:
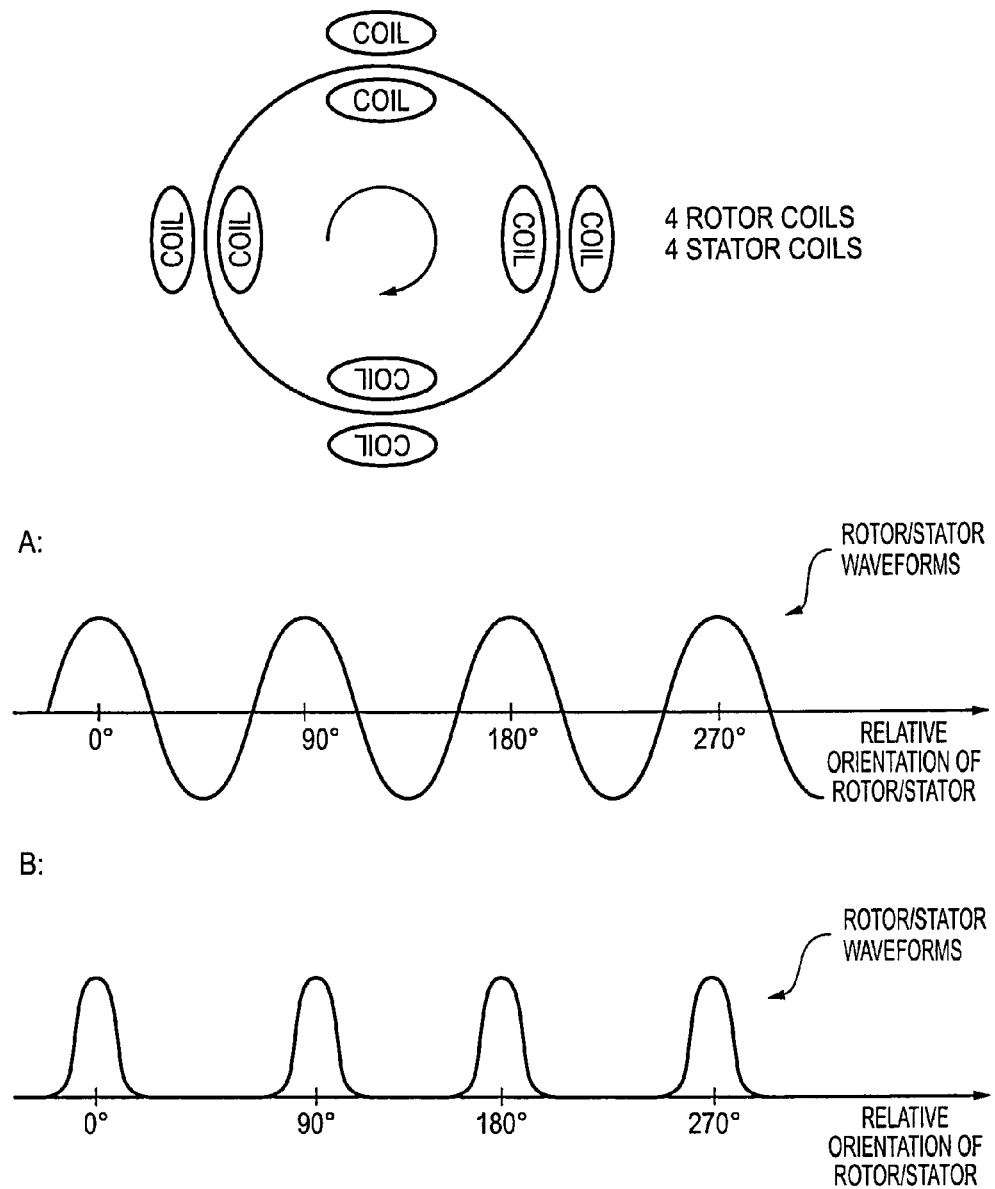
FIG. 10 schematically illustrates the arrangement of an embodiment in which the number of rotor coils and stator coils are the same.

As mentioned above, one of the advantages of the electric motor apparatus described herein is the flexibility in terms of the respective arrangements of the rotor and stator windings (coils) and the respective rotor and stator waveforms which may be applied to them. FIG. 10 schematically illustrates an embodiment in which the rotor has a set of four rotor coils and the stator has a corresponding set of four stator coils. The lower half of FIG. 10 illustrates two alternative waveforms A and B which may be applied to these rotor and stator coils. In the example shown in FIG. 10, the same waveform is applied to the rotor and to the stator. Waveforms A are a continuation sinusoidal waveform, whilst waveforms B are a pulsed waved form.

Figure 11:
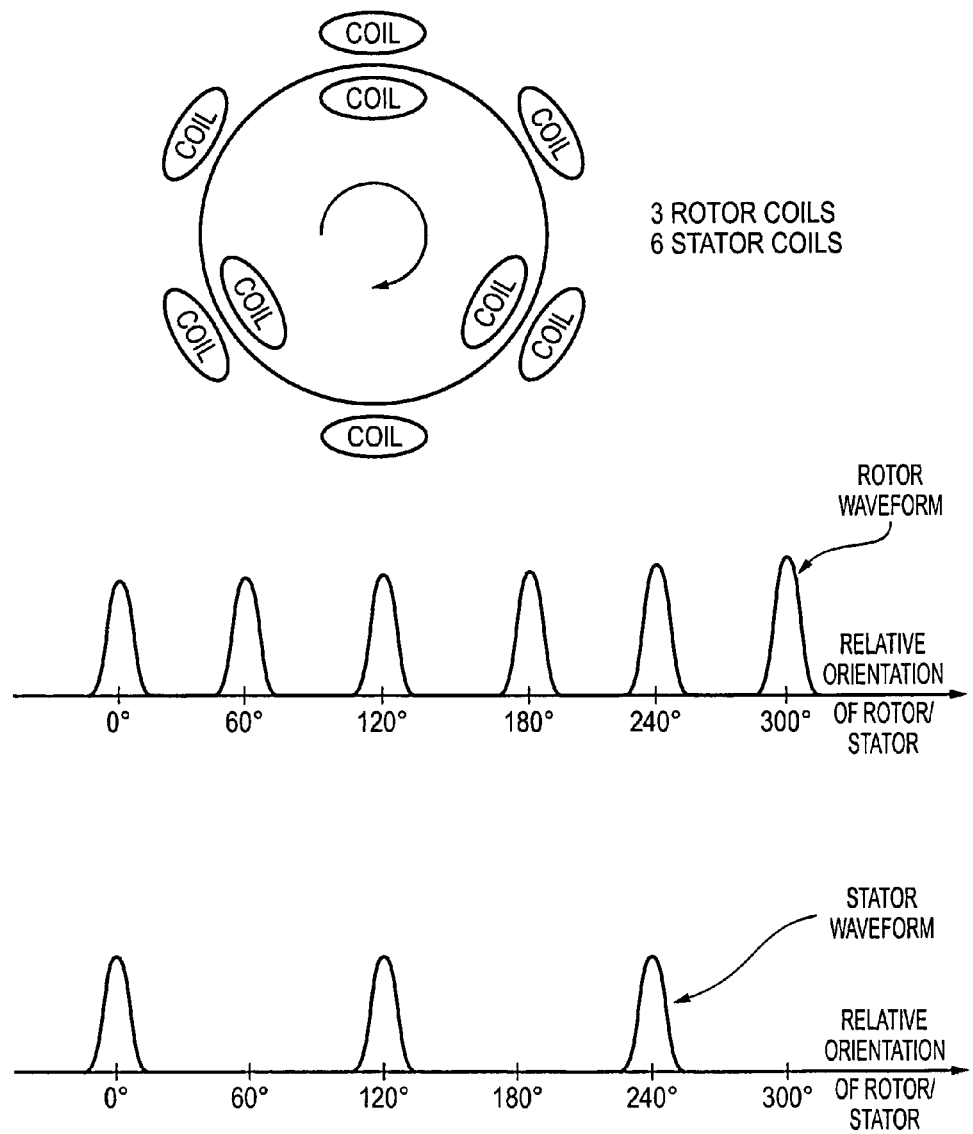
FIG. 11 schematically illustrates an embodiment in which the number of rotor coils and stator coils are different.

FIG. 11 illustrates an embodiment in which the number of rotor and stator coils may differ. In the example illustrated here, there are three rotor coils and 6 stator coils. In the lower part of FIG. 11 the respective waveforms applied to the rotor coils and stator coils are illustrated. It can be seen that both the rotor and the stator waveforms here are pulsed waveforms, wherein the rotor waveform pulses at 60 degree intervals whilst the stator waveform pulses at 120 degree intervals. It should be appreciated that the examples illustrated in FIGS. 10 and 11 are merely illustrative and many permutations of the respective number of rotor and stator coils are possible, together with corresponding waveforms applied to each. Further, the sinusoidal and/or pulsed waveform shapes illustrated in FIGS. 10 and 11 are merely examples and other waveform shapes (e.g. saw-tooth, triangular, square etc) or combinations thereof may also be used.

Figure 12A:
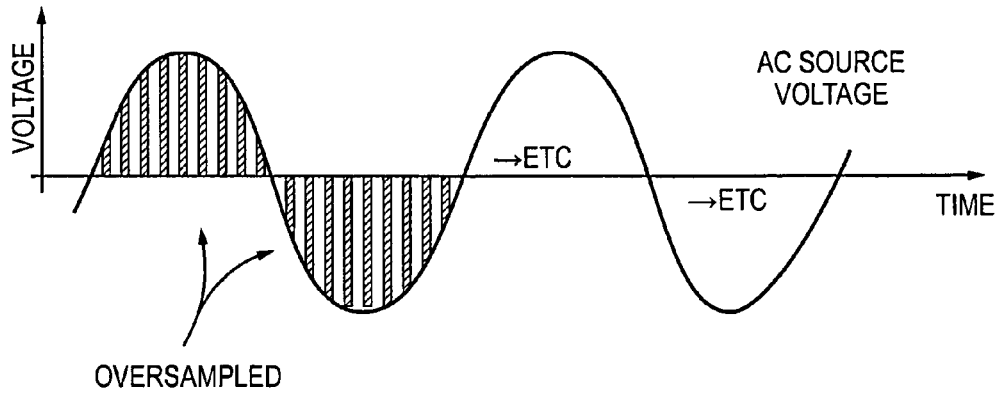
FIGS. 12A-C schematically illustrate the oversampling of a AC source voltage and the use of select portions of the oversampled AC voltage for the generation of a rotor waveform.

In some embodiments, the source voltage supplied to the rotor component may be an AC voltage. Such an AC source voltage waveform is schematically illustrated in FIG. 12A. Also illustrated in FIG. 12A is the oversampling of this AC source voltage, wherein voltage samples of the source voltage are made at a higher frequency than the source voltage itself has. The oversampled AC source voltage may then be reused to approximate a desired rotor waveform. Whilst the samples of the source voltage may well not be able to provide a perfect match for a desired rotor waveform, the application of the oversampled AC voltage can provide a sufficient approximation to the desired rotor waveform to allow the electric motor to operate.

Figure 12B:
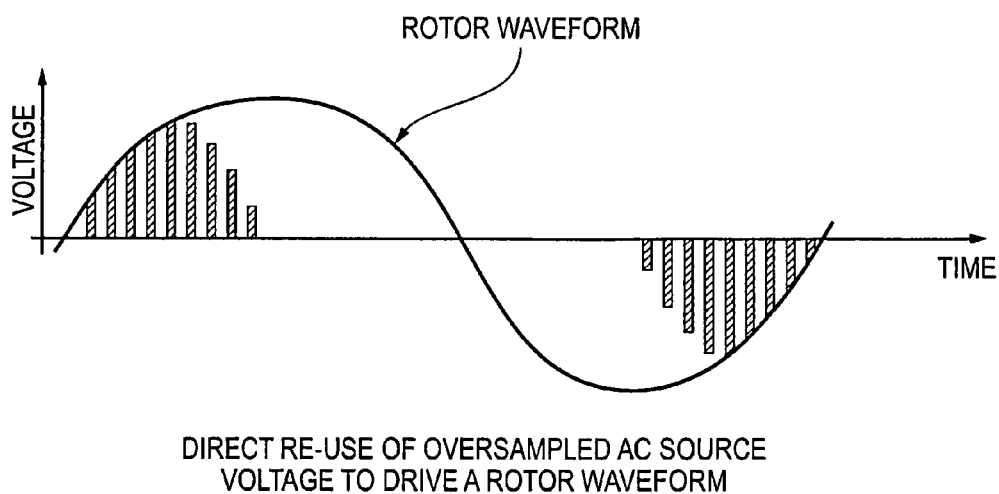
Figure 12C:
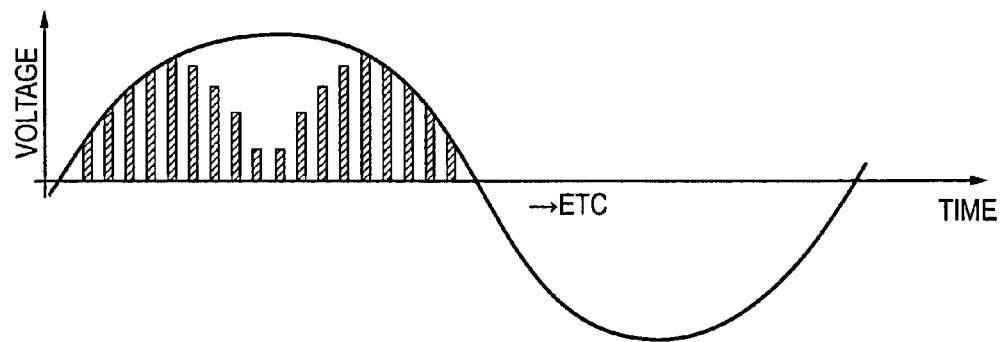

FIG. 12B illustrates an example wherein the oversampled AC source voltage sampled as shown in FIG. 12A is used to approximate a rotor waveform with a period which is approximately double that of the AC source voltage itself. Accordingly, the oversampled source voltage can only provide contributions to the first half of the positive swing of the rotor waveform and the second half of the negative swing of the rotor waveform. Nevertheless, the rotational inertia of the electric motor means that it is not necessary for a perfect rotor waveform to be applied and even an approximation such as that illustrated in FIG. 12B can drive the electric motor. FIG. 12C shows a further variation wherein inversion of the AC source voltage is also possible and this allows a closer approximation to the rotor waveform to be made.

Figure 13:
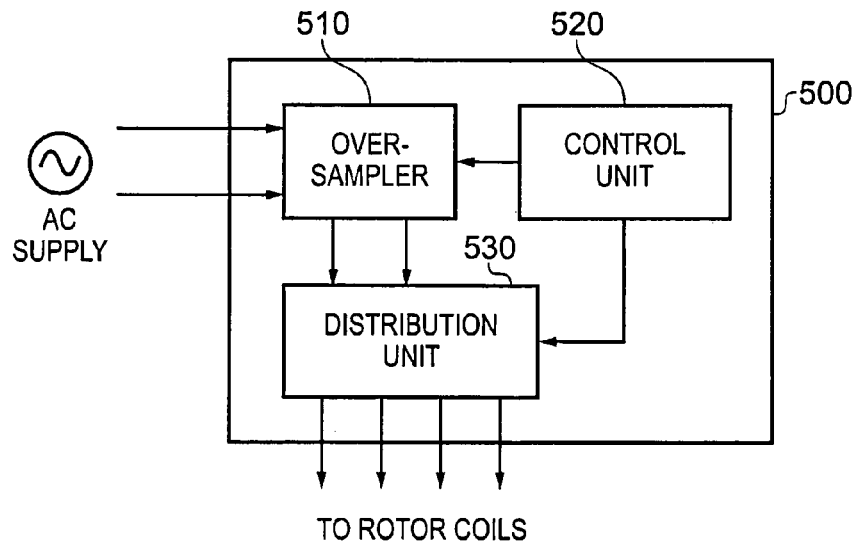
FIG. 13 schematically illustrates a rotor winding control unit configured to perform oversampling of an AC supply voltage in one embodiment.

FIG. 13 schematically illustrates a rotor winding control unit 500 which comprises an oversampling unit 510, a control unit 520 and a distribution unit 530. The oversampler 510 and the distribution unit 530 operate under the control of control unit 520. Accordingly, the control unit 520 instructs the oversampler 510 to perform the oversampling of the received AC supply voltage as shown in FIG. 12A. The oversampled voltage is then passed from oversampler 510 to distribution unit 530 for appropriate distribution to the rotor coils (such as is illustrated in FIGS. 12B and 12C). When inversion such as that illustrated in FIG. 12C is required, the rotor winding control unit 500 additionally comprises inversion capability, which can for example be incorporated into oversampler 510 or distribution unit 530.

Figure 14:
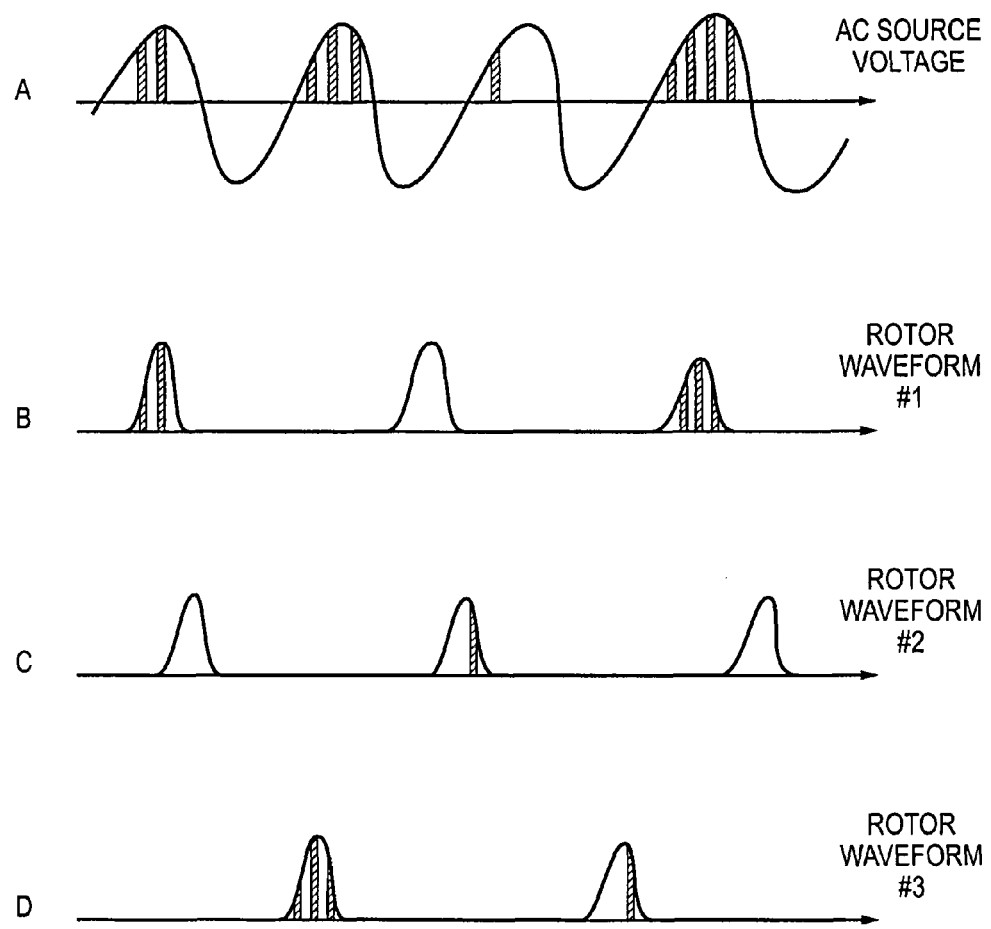
FIG. 14 schematically illustrates the generation of three rotor waveforms by distribution of selected samples from an oversampled AC source voltage supply.

FIG. 14 schematically illustrates a further example of how oversampling and distribution of an AC supply voltage can approximate to three desired rotor waveforms. Graph A in FIG. 14 shows an AC source voltage, together with some selected samples (hatched strips) derived from the above-mentioned oversampling process. It should be noted that only those selected samples which are used for distribution to the rotor coils are shown in graph A in FIG. 14 and the AC source voltage will in fact be fully oversampled as is for example shown in FIG. 12A. Graphs B, C and D in FIG. 14 illustrate the approximation of three desired rotor waveforms (#1, #2 and #3) using the oversampled AC source voltage. Accordingly, those samples of the oversampled AC source voltage which can be applied to approximate one of the rotor waveforms are used as shown in graphs B, C and D in FIG. 14. As mentioned above, it should be appreciated that although the approximation to a particular rotor waveform can in places be somewhat poor (for example, in the time period shown in graph C in FIG. 14, the relative phases of the AC source voltage and the desired rotor waveform #2 only allow very limited use of the samples of the oversampled AC source voltage), the inertia of the rotating motor means that these samples can nonetheless be used to drive the motor. Further, it should be noted that a particular sample of the oversampled waveform may, as necessary, be provided to more than one rotor waveform simultaneously in dependence on the instantaneous requirements of each rotor waveform.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. An electric motor apparatus configured as a universal motor, said electric motor apparatus comprising:
   a rotor component and a stator component, said rotor component arranged to rotate with respect to said stator component;
   a rotor winding arrangement mounted on said rotor component;
   a stator winding arrangement mounted on said stator component;
   a rotational position indicator configured to generate rotational position information indicative of a relative orientation of said rotor component and said stator component;
   a rotor winding control unit fixedly mounted on said rotor component, said rotor winding control unit coupled to a rotor supply voltage supplied to said rotor component and configured to perform a rotor waveform generation operation to generate a rotor waveform from said rotor supply voltage in dependence on said rotational position information and to apply said rotor waveform to said rotor winding arrangement; and
   a stator winding waveform generator configured to receive a stator supply voltage, to generate therefrom a stator waveform in dependence on said rotational position information and to apply said stator waveform to said stator winding arrangement,
   wherein said rotor waveform and said stator waveform are generated in synchronization with said relative orientation of said rotor component and said stator component in order to synchronize mutual interactions of said rotor winding arrangement and said stator winding arrangement with said relative orientation.

2. An electric motor apparatus as claimed in claim 1, wherein said mutual interactions of said rotor winding arrangement and said stator winding arrangement cause said rotor component to be driven in rotation with respect to said stator component.

3. An electric motor apparatus as claimed in claim 1, wherein said mutual interactions of said rotor winding arrangement and said stator winding arrangement cause resistance to rotation said of said rotor component with respect to said stator component.

4. An electric motor apparatus as claimed in claim 3, further comprising at least one power extraction unit configured to extract electrical power induced in at least one of said rotor winding arrangement and said stator winding arrangement as a result of said resistance to rotation.

5. An electric motor apparatus as claimed in claim 1, wherein said rotor supply voltage is supplied to said rotor component via a slip ring arrangement.

6. An electric motor apparatus as claimed in claim 1, wherein said rotor supply voltage is supplied to said rotor component via a first connection and a second connection, said first connection being arranged at a first axial side of said rotor component and said second connection being arranged at a second axial side of said rotor component.

7. An electric motor apparatus as claimed in claim 1, wherein said rotor winding control unit comprises a digital control unit and a digital-to-analogue converter.

8. An electric motor apparatus as claimed in claim 7, wherein said digital control unit is configured to control said digital-to-analogue converter using binary encoded signals.

9. An electric motor apparatus as claimed in claim 7, wherein said digital control unit is configured to control said digital-to-analogue converter using pulse-width-modulated signals.

10. An electric motor apparatus as claimed in claim 7, wherein said digital control unit comprises a microprocessor unit.

11. An electric motor apparatus as claimed in claim 1, wherein said rotor winding arrangement mounted on said rotor component comprises a plurality of electrically separate windings spaced around a circumference of said rotor component.

12. An electric motor apparatus as claimed in claim 11, wherein said rotor winding control unit is configured to apply an individual rotor waveform to each of said plurality of electrically separate windings of said rotor winding arrangement.

13. An electric motor apparatus as claimed in claim 1, wherein said rotor winding arrangement and said stator winding arrangement have a same number of electrically separate windings as one another.

14. An electric motor apparatus as claimed in claim 1, wherein said rotor winding arrangement and said stator winding arrangement have a different number of electrically separate windings from one another.

15. An electric motor apparatus as claimed in claim 1, wherein at least one of said rotor waveform and said stator waveform comprises a sinusoidal waveform.

16. An electric motor, apparatus as claimed in claim 1, wherein at least one of said rotor waveform and said stator waveform comprises a pulsed waveform.

17. An electric motor apparatus as claimed in claim 1, wherein said rotational position indicator comprises a reading unit configured to read a shaft encoding.

18. An electric motor apparatus as claimed in claim 1, wherein said stator winding waveform generator comprises a stator winding control unit configured to communicate with said rotor winding control unit.

19. An electric motor apparatus as claimed in claim 18, wherein said stator winding control unit is configured to communicate wirelessly with said rotor winding control unit.

20. An electric motor apparatus as claimed in claim 18, wherein said stator winding control unit is configured to communicate via a wired connection with said rotor winding control unit.

21. An electric motor apparatus as claimed in claim 20, wherein communication via said wired connection is overlaid on said rotor supply voltage.

22. An electric motor apparatus as claimed in claim 1, wherein said rotor winding control unit is mounted on an axial face of said rotor component.

23. An electric motor apparatus as claimed in claim 1, wherein said rotor supply voltage is a DC voltage.

24. An electric motor apparatus as claimed in claim 1, wherein said rotor supply voltage is an AC voltage.

25. An electric motor apparatus as claimed in claim 24, wherein said rotor winding control unit comprises an oversampler configured to oversample said AC voltage.

26. An electric motor apparatus as claimed in claim 25, wherein said rotor winding control unit comprises a distributor configured to distribute selected portions of said oversampled AC voltage to said rotor winding arrangement.

27. An electric motor apparatus as claimed in claim 26, wherein said rotor winding arrangement comprises a plurality of electrically separate windings and said distributor is configured to distribute said selected portions of said oversampled AC voltage amongst said plurality of electrically separate windings.

28. An electric motor apparatus as claimed in claim 27, wherein said distributor is configured to selectively distribute at least one of said selected portions of said oversampled AC voltage simultaneously to more than one of said electrically separate windings.

29. An electric motor apparatus as claimed in claim 1, wherein in axial view said rotor component is mounted inside said stator component.

30. An electric motor apparatus as claimed in claim 1, wherein in axial view said rotor component is mounted outside said stator component.

31. An electric motor apparatus configured as a universal motor, said electric motor apparatus comprising:
   rotor means and stator means, said rotor means for rotating with respect to said stator means;
   rotor winding means mounted on said rotor means;
   stator winding means mounted on said stator means;
   rotational position indication means for generating rotational position information indicative of a relative orientation of said rotor means and said stator means;
   rotor winding control means fixedly mounted on said rotor component, said rotor winding control means coupled to a rotor supply voltage supplied to said rotor component and for performing a rotor waveform generation operation to generate a rotor waveform from said rotor supply voltage in dependence on said rotational position information and for applying said rotor waveform to said rotor winding means; and
   stator winding waveform generation means for receiving a stator supply voltage, for generating therefrom a stator waveform in dependence on said rotational position information and for applying said stator waveform to said stator winding means,
   wherein said rotor waveform and said stator waveform are generated in synchronization with said relative orientation of said rotor means and said stator means in order to synchronize mutual interactions of said rotor winding means and said stator winding means with said relative orientation.

32. A method of operating an electric motor apparatus configured as a universal motor, said electric motor apparatus comprising: a rotor component and a stator component, said rotor component arranged to rotate with respect to said stator component; a rotor winding arrangement mounted on said rotor component; and a stator winding arrangement mounted on said stator component, the method comprising:
   generating rotational position information indicative of a relative orientation of said rotor component and said stator component;
   coupling a rotor winding control unit fixedly mounted on said rotor component to an rotor supply voltage supplied to said rotor component;
   performing a rotor waveform generation operation in said rotor winding control unit to generate a rotor waveform from said rotor supply voltage in dependence on said rotational position information;
   applying said rotor waveform to said rotor winding arrangement;
   receiving a stator supply voltage in a stator winding waveform generator and generating therefrom a stator waveform in dependence on said rotational position information; and
   applying said stator waveform to said stator winding arrangement,
   wherein said rotor waveform and said stator waveform are generated in synchronization with said relative orientation of said rotor component and said stator component in order to synchronize mutual interactions of said rotor winding arrangement and said stator winding arrangement with said relative orientation.

* * * * *